United States Patent [19]

Rose et al.

[11] 3,844,895
[45] Oct. 29, 1974

[54] FILTRATION AND INCUBATION APPARATUS

[75] Inventors: Robert E. Rose, Chelmsford; Adrian Reti, Cambridge, both of Mass.

[73] Assignee: Millipore Corporation, Bedford, Mass.

[22] Filed: Oct. 17, 1973

[21] Appl. No.: 407,050

Related U.S. Application Data

[62] Division of Ser. No. 214,743, Jan. 3, 1972, abandoned.

[52] U.S. Cl................. 195/139, 210/436, 210/445, 210/446
[51] Int. Cl............................................. C12k 1/10
[58] Field of Search.............. 195/139, 127, 103.5 R

[56] References Cited
UNITED STATES PATENTS

| | | | |
|---|---|---|---|
| 2,665,009 | 1/1954 | Harstick | 210/445 X |
| 2,879,207 | 3/1959 | Poitras | 195/139 |
| 2,923,669 | 2/1960 | Poitras | 195/103.5 R |
| 3,149,758 | 9/1964 | Bush et al. | 222/189 |
| 3,520,416 | 7/1970 | Keedwell | 55/524 X |
| 3,523,408 | 8/1970 | Rosenberg | 55/159 |
| 3,556,302 | 1/1971 | Agranat | 210/445 X |
| 3,658,183 | 4/1972 | Best et al. | 210/446 X |

OTHER PUBLICATIONS

Millipore Catalog MC/1, pg. 1A080; 1970.

*Primary Examiner*—A. Louis Monacell
*Assistant Examiner*—Robert J. Warden

[57] ABSTRACT

An apparatus for filtering fluids formed from two mating housing sections, each having a fluid inlet and adapted, when joined, to hold therebetween a filter and a pad therefor, and form a chamber above the filter and seal the chamber from the atmosphere. The filter has a hydrophobic edge extending into the chamber to permit air to pass through the edge.

1 Claim, 4 Drawing Figures

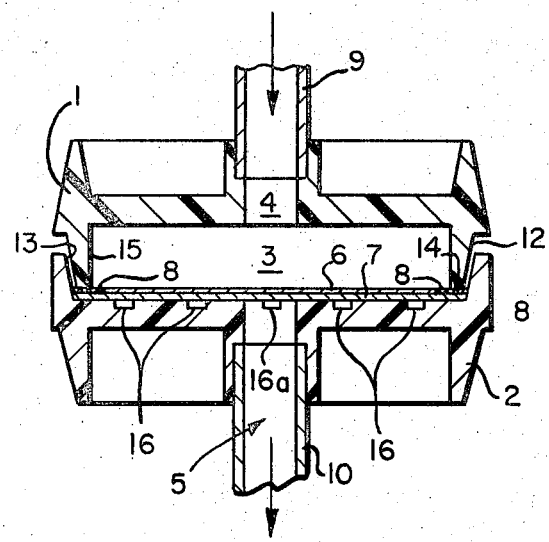
FIG. 1
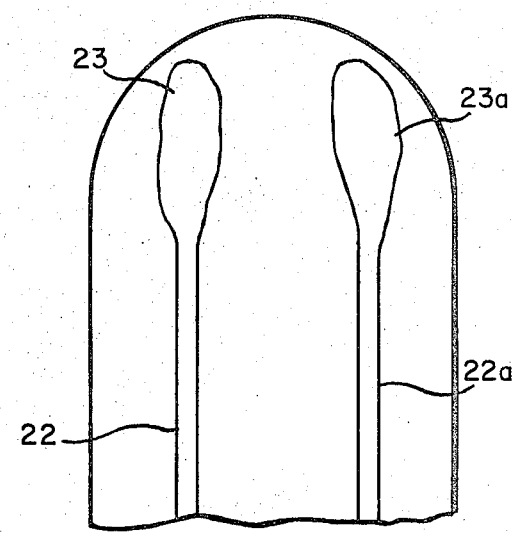
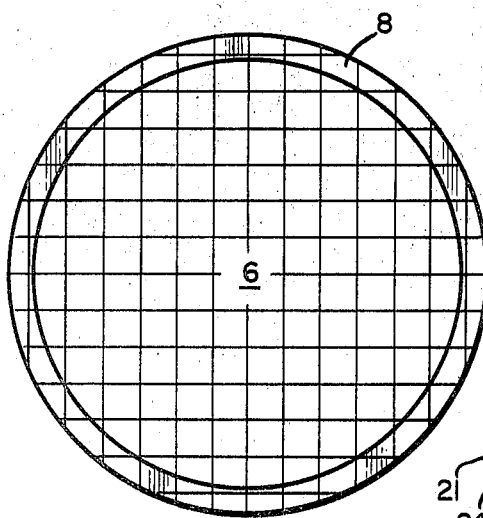
FIG. 2
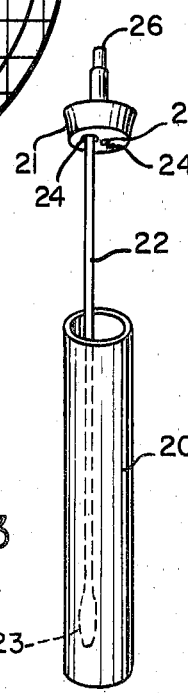
FIG. 3
FIG. 4

FILTRATION AND INCUBATION APPARATUS

This is a division, of application Ser. No. 214,743, filed Jan. 3, 1972 now abandoned.

This invention relates to an apparatus for filtering liquids to isolate microorganisms and for subsequently incubating the isolated microorganism.

At the present time, there are available apparatus for filtering liquids to isolate microorganisms therein and for subsequently incubating the microorganisms. In these apparatus, a filter layer supported on a resilient pad is placed between two mating housing sections shaped to form a chamber above the filter and adapted to seal the filter from the atmosphere to prevent liquid entering the chamber from bypassing the filter. Each housing section is provided with an orifice to permit liquid to enter the chamber and to be removed from the chamber adjacent the downstream surface of the filter. In use, a conduit is attached to the orifice adjacent the upstream surface of the filter, and the other end of the conduit is placed into the liquid sample being tested. A hand-operated syringe is attached to the other orifice in the second housing section adjacent the downstream surface of the filter so that a vacuum can be formed within the chamber thereby causing a pressure drop across the filter which forces the liquid being tested through the filter. Unfortunately, if an air bubble is formed within the tube passing sample into the apparatus after the filter becomes wet with liquid, the air will displace liquid above the filter resulting in a condition known as "air lock." That is, the pressure differential necessary to force the air through the wetted filter is substantially greater than the pressure needed to pass only liquid through the filter and this greater pressure cannot be generated with the hand-operated syringes normally employed during use. Accordingly, when air is entrapped in the wetted filter, the filtration and incubation apparatus cannot be used to filter the remaining liquid in the sample thus necessitating repeating the filtration step with a new filtration and incubation apparatus.

The present invention provides an apparatus whereby liquid samples can be filtered and incubated regardless of whether an air bubble is present in incoming liquid being filtered. That is, the present invention provides a means for eliminating the "air lock" problem found in the present apparatus. This invention is based upon the discovery that when a filter having a hydrophobic edge extending around the entire circumference or a portion thereof which edge extends into the inlet chamber, air entering the chamber preferentially passes through the hydrophobic portion of the filter rather than through the wetted portion of the filter. Thus, when these filters are employed, liquid in the filter is not displaced by air and the air-lock problem is eliminated.

While filters having hydrophobic edges are known, they have not been employed prior to the invention to prevent air lock. Thus, they have been employed as a final filter in filling apparatus employing pressures substantially in excess of that necessary to remove entrapped air in a wet filter wherein "air lock" is not an undesirable problem but where liquid dripping after filling is to be avoided.

The filter having the hydrophobic edge is supported on a pad and is sealed between two mating housing sections; each section having an orifice for passing liquid therethrough. One housing section, the edges of which contact the filter is shaped to form a chamber adjacent the filter and is adapted so that the edges thereof contact the hydrophobic edge of the filter. Surprisingly, it has been found that when the apparatus is constructed of plastic so that the plastic edges contact the hydrophobic portion of the filter rather than the portion thereof being wetted, a microorganism toxicity problem is eliminated. It is believed that the use of the hydrophobic edge presents migration of materials toxic to isolated bacteria form the plastic material into the filter.

This invention and its operation will be more fully described with reference to the accompanying FIGS.

FIG. 1 is a cross sectional elevational view of the filtration and incubation apparatus of this invention;

FIG. 2 is a top view of the edge-hydrophobic filter employed in this invention;

FIG. 3 is an isometric view of a swab-tube construction which can be employed with the filtration and incubation; and FIG. 4 is a side view, in partial cross section showing the apparatus of FIG. 3 employed in conjunction with the filtration and incubation apparatus of this invention.

Referring to FIG. 1, the filtration and incubation apparatus of this invention comprises a top housing section 1 and a bottom housing section 2 shaped so that when fit together a seal is attained between the chamber 3 and the outside atmosphere. The top section 1 is provided with a fluid inlet 4 and a bottom section 2 is provided with a fluid outlet 5. The inside diameter of the lower portion 2 is shaped to accommodate the filter 6 and a support pad 7 for the filter 6. The outer edge of the filter 6 comprises a hydrophobic section 8 which extends the entire circumference of the filter 6. As shown in FIG. 2, the inlet surface of the filter 6 is marked with grids of any desired size to assist in quantifying calories which may develop thereon. The inlet 4 is adapted to retain a tube 9 which can be connected to a source of liquid being sampled. The outlet 5 is connected to a tube 10 which in turn is connected to a means for reducing pressure below atmospheric such as a hand-operated syringe (not shown).

The upper section 1 preferably has a tapered outside wall 12 while the lower section 2 has a tapered inside wall 13 so that when the two sections 1 and 2 are pressed together, an effective seal at the interface thereof is effected. The hydrophobic edge 8 is positioned between the pad and the bottom surface 14 of the top section 1 when the apparatus is pressed together to form a unitary construction. It has been found that when the bottom surface 14 contacts the hydrophobic section 8 during use, toxic material previously found to migrate into the wet filter 6, particularly when the upper section 1 is formed from a plastic material, is presented.

During use, a vacuum is placed on tube 10 which causes a pressure drop across pad 7 and filter 6 thereby causing incoming liquid to pass through tube 9, and into chamber 3. The liquid then passes through filter 6, pad 7, outlet 5 and tube 10. Any microorganisms in the incoming liquid are deposited upon the upper surface of filter 6 and caused to be retained by Van der Walls forces. Should any air become entrapped in tube 9 and caused to enter chamber 3 by virtue of the pressure differential, the air preferentially passes through filter 6 at the hydrophobic edge 8 rather than through the wetted central portion of the filter 6. In this manner, the wetted portion of the filter always contains liquid which is not displaced by air and the problem of air lock is eliminated. After all of the liquid entering through tube 9 has been filtered, tube 9 then is removed from inlet 4 so that a nutrient liquid composition that accelerates the growth of microorganisms that are retained on the filter surface can be filtered through the filter 6 and pad 7. The liquid passing through the filter 6 and the pad 7 at a radial point intermediate the outlet 5 and the unit surface 15 of the top section passed into a spiral slot 16 of bottom section 2 which slot has an exit 16a into outlet 5 thereby facilitating liquid filtration. After filtration and introduction of nutrient material is complete, the inlet 4 and outlet 5 are sealed from the atmosphere and the complete filtration and incubation apparatus then can be heated to a temperature which promotes the growth of microorganisms.

A preferred embodiment of the present invention will be described with reference to FIGS. 3 and 4. The apparatus shown in FIG. 3 comprises a means for collecting microbiological samples and contacting them with a nutrient material. The apparatus comprises a tube 20 adapted to retain a liquid nutrient material, a cover 21 and a swab 22. The swab 22 has a porous material 23 adhered at the end thereof such as cotton batting which can be wetted and brushed over a dry surface or dipped in a liquid to pick up any microorganisms. The cover 21 has two hollow sockets 24 into which the swab 22 can be press-fit and retained therein. The cover 21 also has a liquid inlet 25 which communicates with the liquid outlet 26. In use, this swab 22 is brushed over a dry surface or dipped into a liquid to be tested, placed into the socket 24 and the cover 21 is press fit into the tube 20 which contains a liquid nutrient material. The tube 20 then is shaken so that any microorganisms on the porous material 23 are mixed with a nutrient material. The closed tube 20 then is positioned so that the outlet 26 is fit into inlet 4 of the filtration and incubation apparatus as shown in FIG. 4. When the tube is so positioned, a vacuum is drawn at outlet 10 as described above with reference to FIG. 1 so that the liquid nutrient material 27 containing the microorganisms from the swabs 23 and 23a is passed through filter 6 and pad 7 into outlet 5 and any microorganisms therein are retained on the filter 6. The apparatus shown in FIGS. 3 and 4 provide substantial advantages over present techniques for collecting and growing microorganisms employing a swab. In these prior techniques, this swab is contacted with the material being tested and admixed with a nutrient material in a tube substantially as described. The resultant nutrient material then is pipetted and applied to agar gel or any other medium adapted to facilitate microorganism growth. The apparatus of this invention eliminates the pipetting step and also has the following advantages.

While the invention has been described with the embodiments shown in the accompanying drawings, it is to be understood that the particularl shape of the mating sections 1 and 2 are not important so long as the mating section provides an adequate seal from the atmosphere and retains the filter and pad in a stationary position during filtration without rupturing the filter. For example, the mating sections need not be of unitary construction and need not be press fit. Thus, the two sections can be screwed together or gasket, rings or flanges can be employed to attain the desired result such as are shown in U.S. Pat. No. 2,879,207, issued Mar. 24, 1959.

Suitable filters include materials formed from cellulose esters such as cellulose acetate and cellulose nitrate and having an average pore size extending in the submicrometer range as small as about 0.025 micrometer. Representative filter materials are marketed by Millipore Corp. and identified as MF-Millipore (R) filters, Celotate (R) filters, Duralon, (R) filters, Mitex (R) filters, Polyvic (R) filters, Solvinert (R) filters and Microweb (R) filters. The filter edge can be rendered hydrophobic such as by treatment with a silane or other means known in the art.

We claim:

1. Apparatus for collecting, isolating and growing microorganisms which comprises a container adapted to retain liquid nutrient for microorganisms, said container having a cover to retain at least one swab within said container and having a liquid outlet, apparatus for filtering liquids which comprise a first housing section having an inlet, a flat filter and a support pad for said filter supported by a second housing section, said first and second housing sections being shaped to form a chamber adjacent an inlet surface of said filter, to form a seal between said housing sections, and to hold said filter and pad stationary adjacent said chamber, said filter having a porous edge formed of a hydrophobic material which edge extends into said chamber, the liquid outlet of said cover being fit into the inlet of said first housing section to form a seal therewith from the atmosphere.

* * * * *